July 5, 1960   W. F. MARKLEY ET AL   2,943,517
TWO-SPEED DRIVE
Filed Dec. 17, 1958   3 Sheets-Sheet 1

INVENTORS
WILLIAM F. MARKLEY,
HENRI A. BRYSSELBOUT
BY AND RICHARD L. SMIRL.

ATTORNEY

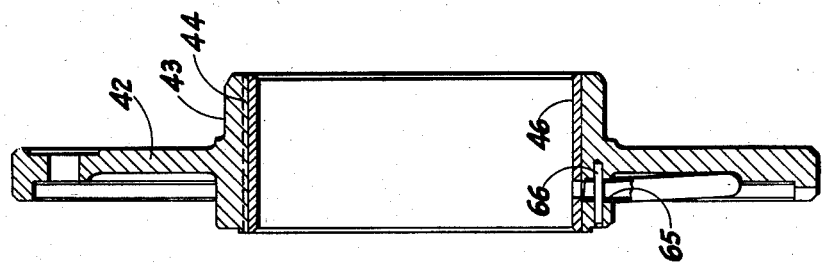
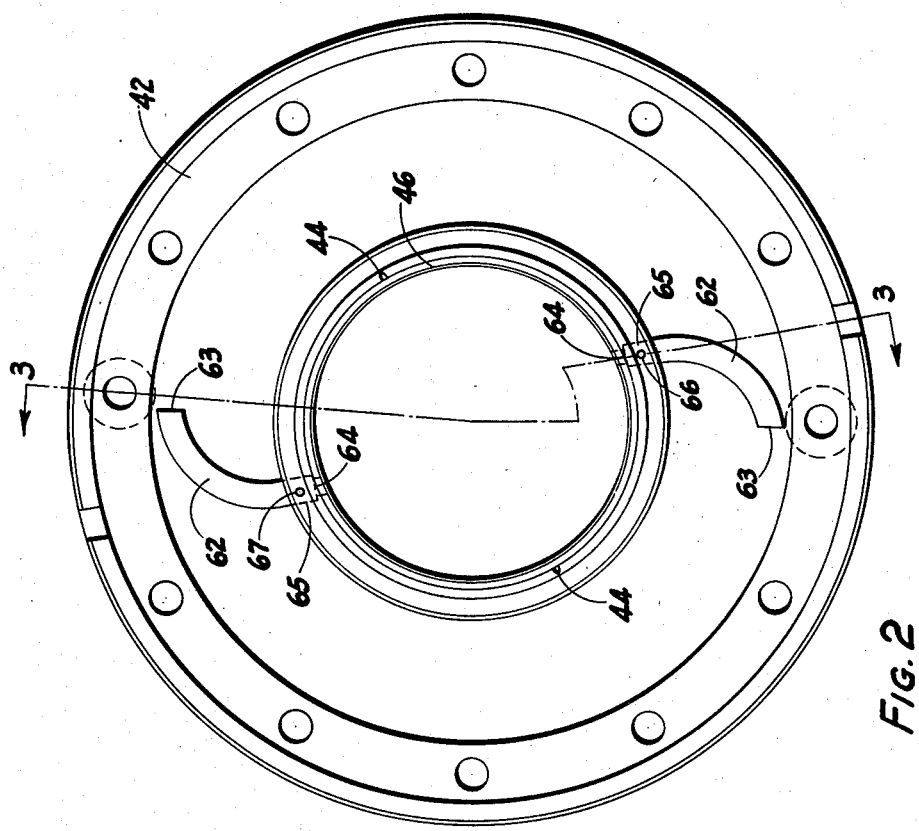

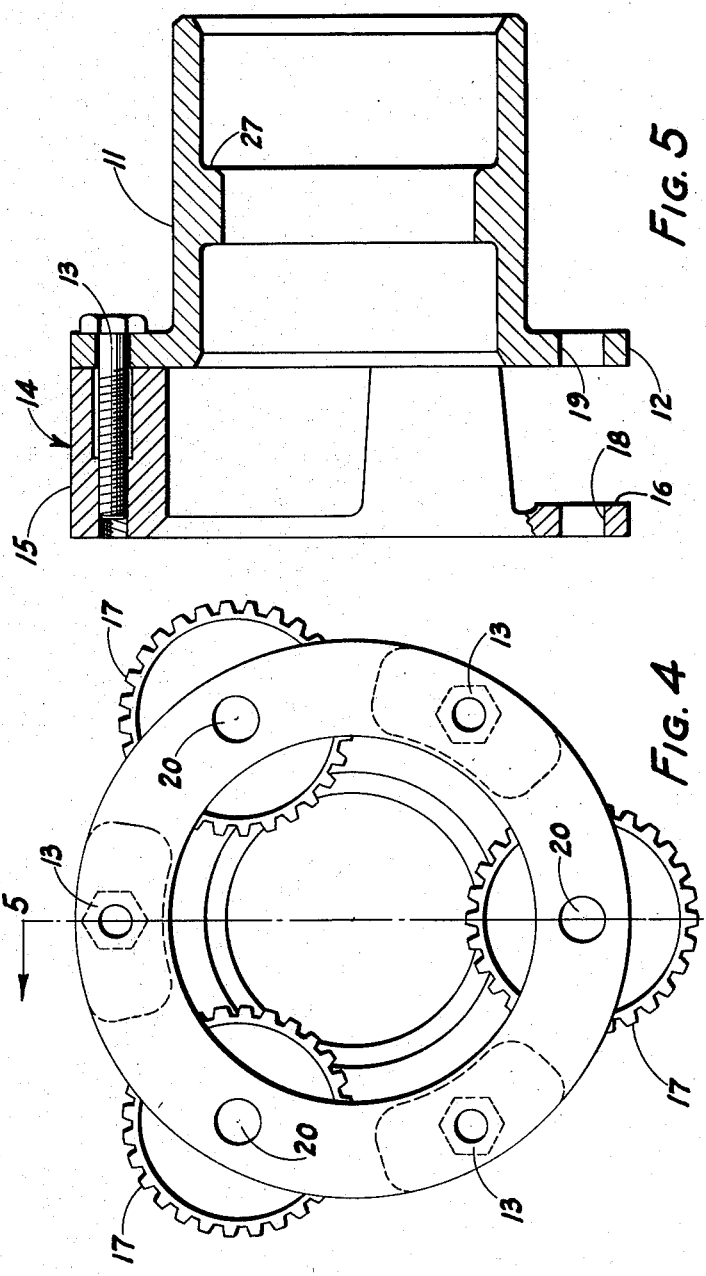
INVENTORS
WILLIAM F. MARKLEY,
HENRI A. BRYSSELBOUT
AND RICHARD L. SMIRL.
BY
ATTORNEY

United States Patent Office 2,943,517
Patented July 5, 1960

2,943,517
TWO-SPEED DRIVE

William F. Markley, Hellam, and Henri A. Brysselbout, York, Pa., and Richard L. Smirl, La Grange Park, Ill., assignors to Borg-Warner Corporation, Chicago, Ill., a corporation of Illinois Filed Dec. 17, 1958, Ser. No. 781,157

5 Claims. (Cl. 74—750)

This invention relates to a two-speed drive.

It is an object of the invention to provide a two-speed drive of simple construction, easily assembled and economically manufactured. A further object is to provide a drive of the type just above-mentioned, wherein the drive is hermetically contained within a housing.

Yet another object of the invention is to provide a self-contained, two-speed drive, hermetically enclosed within a casing, the casing, in part, forming a lubricant containing sump, and pump means are provided for positively forcing lubricant from the sump to various bearing surfaces.

In a typical refrigerating apparatus for over-the-road vehicles and wherein the apparatus is driven from the vehicle engine, the drive ratio between the engine and refrigerating apparatus must be such that sufficient refrigeration will be provided at idling speeds to provide for the normal refrigerating needs. At such time, however, that the vehicle is driven at high engine speeds, it is found that the refrigerating apparatus is over-speeded. A two-speed drive, therefore, must be provided to step up the ratio between engine and refrigerating apparatus at low speeds and providing for a one-to-one ratio at high speeds. Further, in order to be universally applicable, such a drive must be self-contained and self-lubricating.

Still another object of the invention, therefore, is to provide a self-contained, hermetically sealed, two-speed drive of broad general application. Yet another object is to provide a drive of the type just mentioned including sump means containing a body of lubricant and a pump driven from the drive for providing positive force feed lubrication to the various bearing surfaces of the drive.

The invention consists of the novel constructions, arrangements and devices to be hereinafter described and claimed for carrying out the above-stated objects and such other objects as will appear from the following description of preferred embodiments of the invention described with reference to the accompanying drawings, in which:

Fig. 2 is a side view of a portion of the enclosing housing including lubricant receiving tubes;

Fig. 3 is a cross section taken on the line 3—3 of Fig. 2;

Fig. 4 is a side view of a planet carrier according to the invention; and

Fig. 5 is a sectional view taken on line 5—5 of Fig. 4.

Like numerals refer to like parts throughout the several views.

Figure 1:
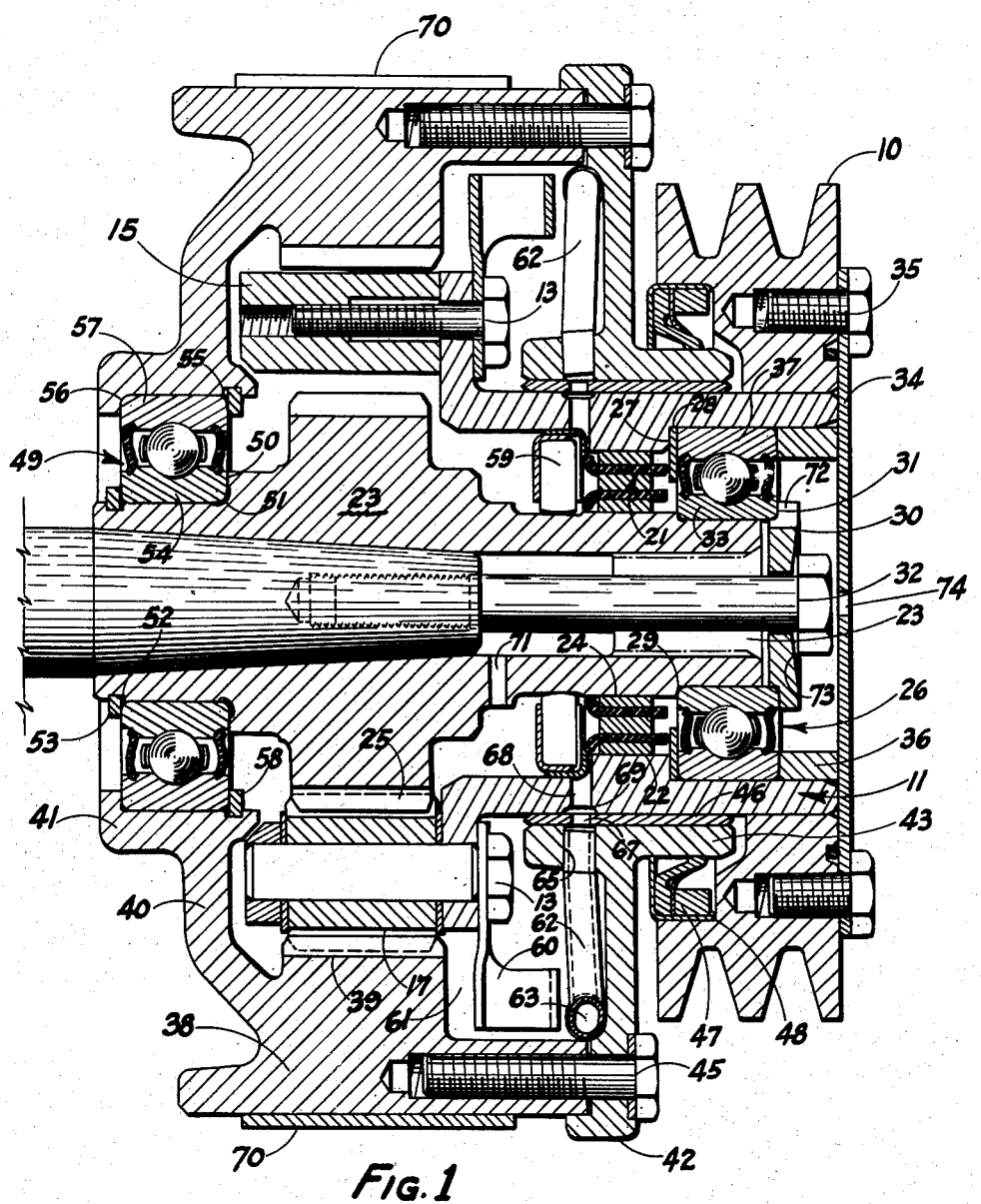
Fig. 1 is a section in side elevation of a two-speed drive according to the invention.

Turning now to the drawings, an input power pulley 10 receives power from any suitable source, such as an engine drive shaft. Press fitted into the pulley 10 is a sleeve-like member 11 for rotation therewith. Member 11 stands outwardly from pulley 10 and terminates in a flange 12. Bolted to flange 12 by way of a plurality of bolts 13 is a planet carrier 14. Planet carrier 14 comprises a ring-like sleeve portion 15, having three passages 16 radially formed therethrough and circumferentially equally spaced thereabout. Mounted in each passage 16 is a planet gear 17. Aligned apertures 18 and 19 are formed respectively in planet carrier 14 and flange 12 to receive a planet gear pin 20 for rotationally mounting each gear in the carrier.

A one-way overrunning clutch 21 is received within sleeve 11 with an internal projection 22, formed integrally with sleeve 11, constituting the outer race thereof. Mounted within overrunning clutch 21 is a driven shaft 23, with an external projection 24, formed integrally with shaft 23, constituting the inner race of clutch 21. A sun gear 25 is formed integrally with driven shaft 23 and in engagement with planet gears 17. While for ease of manufacture sun gear 25 generally will be integrally formed with driven shaft 23, it will be appreciated that the sun gear may be separately formed and press fitted to the shaft. A ball bearing 26 encircles driven shaft 23 and is received within sleeve 11. Sleeve 11 is formed with an internal shoulder 27. Bearing 26 sets against shoulder 27 and a washer 28 is interposed between the shoulder and the bearing. The purpose of washer 28 is to insure that there is no inter-action between bearing 26 and overrunning clutch 21. An outwardly extending shoulder 29 is formed on driven shaft 23 for receiving bearing 26. A circular plate 30, having a shoulder 31 thereon, is bolted to shaft 23 by way of a bolt 32 with the inner race 33 of bearing 26 being received within shoulder 31. Sufficient pressure is exerted on plate 30 by bolt 32 to make the inner race 33 of bearing 26 rotate integrally with shaft 23.

A cover plate 34 is bolted to pulley 10 by way of a plurality of bolts 35. A spacer ring 36 is seated internally within sleeve 11 and its length is so chosen that when cover plate 34 is bolted to pulley 10, pressure is exerted on spacer ring 36 of sufficient magnitude so that the outer race 37 of bearing 26 rotates in unison with sleeve 11.

An imperforate drum 38 suitably encloses the entire mechanism. Drum 38 comprises an integrally formed internal ring gear 39 in engagement with planet gears 17 and an integrally formed cover plate 40, including a bearing support 41. As with sun gear 25, it will be appreciated that ring gear 39 may be formed separately from drum 38 and press fitted therewithin. Also, cover plate 40 may be formed separately from drum 38 and attached thereto by way of a suitable gasket and bolts. A similar, oppositely directed cover plate 42 is provided and includes a bearing support 43. Bearing support 43 includes a plurality of oil return grooves 44 formed longitudinally thereof. Cover plate 42 is attached to drum 38 by way of a plurality of bolts 45. A bushing-bearing 46 is received within bearing support 43, supporting sleeve 11 for rotation with respect to drum 38. A seal 47 encircles bearing support 43 and is received within a counterbore 48 formed in pulley 10.

Bearing support 41 receives a bearing 49 for supporting shaft 23 for rotation with respect to drum 38. Shaft 23 is provided with a shoulder 50, and in which an O ring 51 is seated. Shaft 23 is further provided with a groove 52, in which is pressed a snap ring 53 which exerts sufficient force on the inner race 54 of bearing 49 for the inner race to become, in effect, an integral part of shaft 23. Bearing support 41 is provided with a groove 55 and a shoulder 56. The outer race 57 of bearing 49 is seated against shoulder 56 and is maintained in position by a snap ring 58 received within groove 55. The arrangement is such that the outer race 57 of bearing 49 rotates integrally with drum 38.

A felt wiper 59 is seated between driven shaft 23 and sleeve 11 for a purpose to be pointed out hereinafter. A plurality of oil impellers 60 are mounted on flange 12 for rotation therewith by way of the bolts 13 for providing force fed lubricant to the various bearing surfaces. The lubricant is contained within the cavity formed by drum 38 in conjunction with cover plate 42, which cavity forms an oil sump 61. Means are provided for leading the oil within sump 61 to the various bearing surfaces. This takes the form of two oil pick-up tubes 62, terminating with their inlet ends 63 facing into the direction of oil movement under the influence of impellers 60. On their outlet ends 64, oil tubes 62 are maintained in position in bearing support 43 by being fitted within a passageway 65 formed through support 43 and secured therein by a pin 66. Bushing-bearing 46 is press fitted within bearing support 43 to maintain the two in assembled relationship and has a pair of apertures 67 formed through a wall thereof, each in alignment with a passageway 65. Sleeve 11 is formed with a plurality of passageways 68 through a wall thereof, which lead to overrunning clutch 21. A circumferential groove 69 is formed on the outer face of sleeve 11 serving to connect the apertures 67. A split band 70 is provided exteriorly of drum 38 for arresting rotation of same when tightened thereon by some suitable mechanism, such as a solenoid (not shown).

Means must be provided for satisfactorily venting the lubricant cavity without risking loss of lubricant. In the absence of such vents, the lubricant cavity would be sealed from atmospheric pressure, which could result in excessive internal pressures due to the operating temperature changes. Without provision for venting, problems might arise with internal pressures blowing out the seals of the ball bearings. Such a venting arrangement could follow customary procedures and, as shown in Fig. 1, could take the form of vent passages 71, 72, 73 and 74. These passages would satisfactorily provide for the maintenance of atmospheric pressure internally in the entire mechanism and minimize loss of lubricant.

*Operation*

Initially, on start-up, the drive is through the planetary arrangement, so that the output is stepped up in rotational speed over the input. Band 70 is in its normal retaining position, allowing no rotation of drum 38. As pulley 10 is rotated, sleeve 11 is rotated therewith. With the rotation of sleeve 11, planet gears 17 are translated about an axis comprising driven shaft 23. Since drum 38 is held against rotation by band 70, ring gear 39 is also non-rotatable. Therefore, as the planet gears 17 are translated, they are, at the same time, rotated about their own individual axes by engagement with stationary ring gear 39. This has the effect of rotating sun gear 25 which, in turn, carries with it driven shaft 23.

At that speed at which it is desired to vary the ratio to a one-to-one drive, a centrifugal governor (not shown) actuates the solenoid (not shown) to release band 70 from around drum 38. This permits drum 38 to rotate as a body. As the drum 38 picks up in rotational speed, driven shaft 23 drops in speed. Driven shaft 23 continues to drop in speed until such time as it drops slightly below the speed of input pulley 10 and sleeve 11. At this time, overrunning clutch 21 picks up driven shaft 23 and the drive is then directly from sleeve 11 through clutch 21 to driven shaft 23 at a one-to-one ratio.

It will be apparent that should the speed of input pulley 10 drop below the cutout point, the solenoid (not shown) will again be energized to tighten band 70, restraining drum 38 from rotating, at which time the drive will be through planetary arrangement with the aforementioned increase in ratio.

During rotation, oil impellers 60 force oil into oil pick up tubes 62, whence the oil flows through apertures 67 of bushing-bearing 46 and thence into groove 69 from whence it flows into passageways 68 and thence to the overrunning clutch 21. Felt wiper 59 serves to keep the overrunning clutch cavity full of oil to insure that the overrunning clutch 21 runs in a flooded condition. In the absence of the felt wiper, the oil would immediately drain back to the sump.

In addition, oil passing through apertures 67 in bushing-bearing 46 also works its way between the bearing and sleeve to provide proper lubrication at this point. Oil seal 47 prevents that oil which works its way to the right, as seen in Fig. 1, from leaving the drive. Oil return grooves 44 serve to relieve oil accumulating behind seal 47 allowing the oil to flow back to sump 61.

All other bearing surfaces are splash-lubricated directly by the oil within sump 61.

We wish it to be understood that our invention is not to be limited to the specific constructions and arrangements shown and described, except only insofar as the claims may be so limited, as it will be apparent to those skilled in the art that changes may be made without departing from the principles of the invention.

What is claimed is:

1. A two-speed drive comprising, an input power pulley, an elongated sleeve attached thereto and extending therefrom, a driven shaft mounted concentrically within said sleeve and extending therefrom, a one-way clutch within said sleeve and encircling said driven shaft, a plurality of bearings supporting said driven shaft for rotation, a gear train engaged between said sleeve and driven shaft for driving said shaft at a speed faster than said sleeve, means for disengaging said gear train between said sleeve and driven shaft whereby said shaft is driven by said sleeve via said clutch, drum means enclosing said drive and including a lubricant receiving sump, and means within said drum for forcibly supplying lubricant to said bearings.

2. The drive of claim 1 wherein said means for supplying lubricant to said bearings comprises an impeller mounted for rotation by said driven shaft in said lubricant receiving sump, and lubricant tubes having inlets facing into the direction of lubricant movement under the influence of said impeller for receiving said lubricant and directing it to said bearings.

3. A two-speed drive comprising, an input power pulley, an elongated sleeve attached thereto and extending therefrom, a planet gear carrier attached to said sleeve on an end remote from said pulley, a plurality of planet gears attached to said planet carrier, a driven shaft mounted concentrically within said sleeve and extending therefrom, a one-way clutch encircling said driven shaft and within said sleeve whereby said driven shaft may be rotated at a speed greater than said sleeve, a sun gear encircling said driven shaft and attached thereto and in engagement with said planet gears, a drum enclosing said gears and said sleeve and forming a lubricant receiving sump, a ring gear mounted internally in said drum and attached thereto and in engagement with said planet gears, a plurality of bearings supporting said driven shaft for rotation, means for supplying lubricant from said sump to said bearings, and means for arresting the rotation of said drum.

4. A two-speed drive comprising, an input power pulley, an elongated sleeve attached thereto and extending therefrom, a planet gear carrier attached to said sleeve on an end remote from said pulley, a plurality of planet gears attached to said planet carrier, a driven shaft mounted concentrically within said sleeve and extending therefrom terminating beyond said planet carrier, a one-way clutch encircling said driven shaft and within said sleeve, a sun gear encircling said driven shaft and attached thereto and in engagement with said planet gears, a drum enclosing said gears and said sleeve and terminating co-extensively with said sleeve and said pulley and forming a lubricant-containing sump, a ring gear mounted internally within said drum and attached thereto and in engagement with said planet gears, a plurality of bearings supporting said driven shaft for rotation with respect to said drum and with respect to said sleeve, means within said drum for supplying lubricant under pressure to said bearing surfaces, and means for arresting the rotation of said drum.

5. A two-speed drive comprising, an input power pulley, an elongated sleeve attached thereto and extending therefrom, a planet gear carrier attached to said sleeve on an end remote from said pulley, a plurality of planet gears attached to said planet carrier, a driven shaft mounted concentrically within said sleeve and extending therefrom terminating beyond said planet carrier, a one-way clutch encircling said driven shaft and within said sleeve for rotating said shaft on the rotation of said sleeve, a sun gear encircling said driven shaft and attached thereto and in engagement with said planet gears, a drum enclosing said gears and said sleeve and terminating co-extensively with said sleeve and said pulley and forming a lubricant-containing sump, a ring gear mounted internally within said drum and attached thereto and in engagement with said planet gears, a plurality of bearings supporting said driven shaft for rotation with respect to said drum and with respect to said sleeve, an impeller within said drum for supplying lubricant under pressure, lubricant receiving tubes leading to said bearings for receiving said lubricant, and means for arresting the rotation of said drum.

References Cited in the file of this patent

UNITED STATES PATENTS

| | | |
|---|---|---|
| 1,966,434 | Barker | July 17, 1934 |
| 2,336,513 | Taylor | Dec. 14, 1943 |
| 2,681,133 | Kindseth et al. | June 15, 1954 |

FOREIGN PATENTS

| | | |
|---|---|---|
| 540,789 | Italy | Mar. 13, 1956 |